(12) United States Patent
Mo (10) Patent No.: US 9,102,249 B2
(45) Date of Patent: Aug. 11, 2015

(54) CHILD SAFETY SEAT

(71) Applicant: Xiao-Long Mo, Guangdong (CN)

(72) Inventor: Xiao-Long Mo, Guangdong (CN)

(73) Assignee: BP Children's Products HK Co., Limited, Kwai Chung, N.T. (HK)

( * ) Notice: Subject to any disclaimer, the term of this patent is extended or adjusted under 35 U.S.C. 154(b) by 37 days.

(21) Appl. No.: 13/912,203

(22) Filed: Jun. 7, 2013

(65) Prior Publication Data

US 2013/0328369 A1    Dec. 12, 2013

(30) Foreign Application Priority Data

Jun. 7, 2012    (CN) .......................... 2012 1 0187062

(51) Int. Cl.
*A47C 1/08*    (2006.01)
*B60N 2/28*    (2006.01)

(52) U.S. Cl.
CPC ................ *B60N 2/28* (2013.01); *B60N 2/2821* (2013.01); *B60N 2/2887* (2013.01)

(58) Field of Classification Search
CPC .. B60N 2/2806; B60N 2/2821; B60N 2/2824; B60N 2/2827; B60N 2/2887; B60N 2/289; B60N 2/2893
USPC .............................................. 297/250.1, 253
See application file for complete search history.

(56) References Cited

U.S. PATENT DOCUMENTS

| | | | |
|---|---|---|---|
| 5,487,588 A * | 1/1996 | Burleigh et al. | 297/253 |
| 7,467,825 B2 * | 12/2008 | Jane Santamaria | 297/253 |
| 8,182,034 B2 * | 5/2012 | Glance | 297/253 |
| 2008/0303321 A1 * | 12/2008 | Powell | 297/216.11 |
| 2008/0315647 A1 | 12/2008 | Carine | |
| 2009/0273215 A1 * | 11/2009 | Barker et al. | 297/253 |

FOREIGN PATENT DOCUMENTS

| | | |
|---|---|---|
| CN | 100488804 C | 5/2009 |
| CN | 201573566 U | 9/2010 |
| CN | 201685729 U | 12/2010 |
| EP | 0 693 393 A1 | 1/1996 |
| EP | 1 747 115 B1 | 12/2008 |
| EP | 2 439 102 A2 | 4/2012 |
| EP | 2 586 651 A1 | 5/2013 |

\* cited by examiner

*Primary Examiner* — Philip Gabler
(74) *Attorney, Agent, or Firm* — Winston Hsu; Scott Margo (57) ABSTRACT

A child safety seat is adapted to be disposed on a vehicle seat and the vehicle seat comprises a fixing rod. The child safety seat comprises a base, a seat body and a fixing device. An assembling direction is defined on the base and the base is capable of being disposed on the vehicle seat. A facing direction is defined on the seat body and the seat body is assembled on the base along the assembling direction. The fixing device is pivotally connected to the base by a pivot axle and used for connecting with the fixing rod. An axial direction of the pivot axle is perpendicular to the assembling direction and the facing direction. Accordingly, the fixing member of the fixing device of the child safety seat can pivot with respect to the base between an accommodating position and a using position.

4 Claims, 7 Drawing Sheets

CHILD SAFETY SEAT

BACKGROUND OF THE INVENTION

1. Field of the Invention

The invention relates to a child safety seat and, more particularly, to a child safety seat capable of being stored conveniently.

2. Description of the Prior Art

In general, a child safety seat is always assembled on a vehicle seat for seating a child securely during travel. So far the child safety seat used in Europe has to be equipped with an ISOFIX fixing device. The full form of ISOFIX is "International Standards Organization FIX". ISOFIX is a new standard for the child safety seat used in a vehicle. This standard is being accepted by many vehicle manufacturers and the child safety seat can be assembled on the vehicle seat rapidly and easily by this standard. When a vehicle is completed, an ISOFIX fixing rod has been installed in the vehicle already. The manufacturer of a child safety seat also installs an ISOFIX fixing member on the child safety seat. Accordingly, the child safety seat can be fixed in the vehicle easily by connecting the ISOFIX fixing member and the ISOFIX fixing rod. So far all of the conventional ISOFIX fixing members protrude from a base of the child safety seat outwardly so as to be connected to the ISOFIX fixing rod on the vehicle seat. However, when the child safety seat needs to be stored, it is annoying that the ISOFIX fixing member protrudes from the child safety seat outwardly.

SUMMARY OF THE INVENTION

An objective of the invention is to provide a child safety seat capable of being stored conveniently, so as to solve the aforesaid problems.

According to an embodiment of the invention, a child safety seat is adapted to be disposed on a vehicle seat and the vehicle seat comprises a fixing rod. The child safety seat comprises a base, a seat body and a fixing device. An assembling direction is defined on the base and the base is capable of being disposed on the vehicle seat. A facing direction is defined on the seat body and the seat body is assembled on the base along the assembling direction. The fixing device is pivotally connected to the base by a pivot axle and used for connecting with the fixing rod. An axial direction of the pivot axle is perpendicular to the assembling direction and the facing direction.

In this embodiment, the fixing device comprises a fixing frame, the pivot axle and two fixing members. The fixing frame is disposed in the base. The pivot axle is disposed in the base and pivotally connected to the fixing frame. The two fixing members are fixed on opposite ends of the pivot axle and exposed out of opposite sides of the base, respectively. The two fixing members are capable of rotating simultaneously through the pivot axle.

In this embodiment, the fixing device further comprises a sheath member and a ring member. The sheath member is connected to the fixing frame. The ring member is disposed between the sheath member and the pivot axle.

In this embodiment, each of the opposite sides of the base has an accommodating recess and the fixing member is capable of rotating with respect to the base between an accommodating position and a using position. When the fixing member is located at the accommodating position, the fixing member is accommodated in the accommodating recess. When the fixing member is located at the using position, the fixing member is capable of being connected to the fixing rod.

In this embodiment, each of the fixing members comprises a slit hole and each of the opposite sides of the base has a restraining portion. When the fixing member is located at the accommodating position, the restraining portion is engaged with the slit hole so as to position the fixing member at the accommodating position.

In this embodiment, each of the opposite sides of the base has a guiding rib connected to the restraining portion correspondingly. The guiding rib is used for guiding the fixing member when the fixing member is rotating toward the accommodating position.

In another embodiment, each of the opposite sides of the base has a resilient cantilever member and the restraining portion protrudes from an end of the resilient cantilever member correspondingly.

In another embodiment, each of the opposite sides of the base has a void formed thereon and the resilient cantilever member is disposed in the void.

In this embodiment, each of the fixing members comprises an engaging hook disposed in the slit hole and the fixing member is engaged with the fixing rod by the engaging hook.

In this embodiment, the fixing device is an ISOFIX fixing device.

As mentioned in the above, the axial direction of the pivot axle, which pivotally connects the fixing device of the child safety seat to the base, is perpendicularly to the assembling direction of the base and the facing direction of the seat body such that the fixing member of the fixing device of the child safety seat can pivot with respect to the base between the accommodating position and the using position. When the child safety seat of the invention needs to be stored, a user can rotate the fixing member from the using position to the accommodating position so as to accommodate the fixing member in the accommodating recess of the base. Accordingly, the child safety seat can be stored conveniently. Furthermore, when the fixing member is located at the accommodating position, the slit hole of the fixing member can be engaged with the restraining portion of the base such that the fixing member can be positioned at the accommodating position securely.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
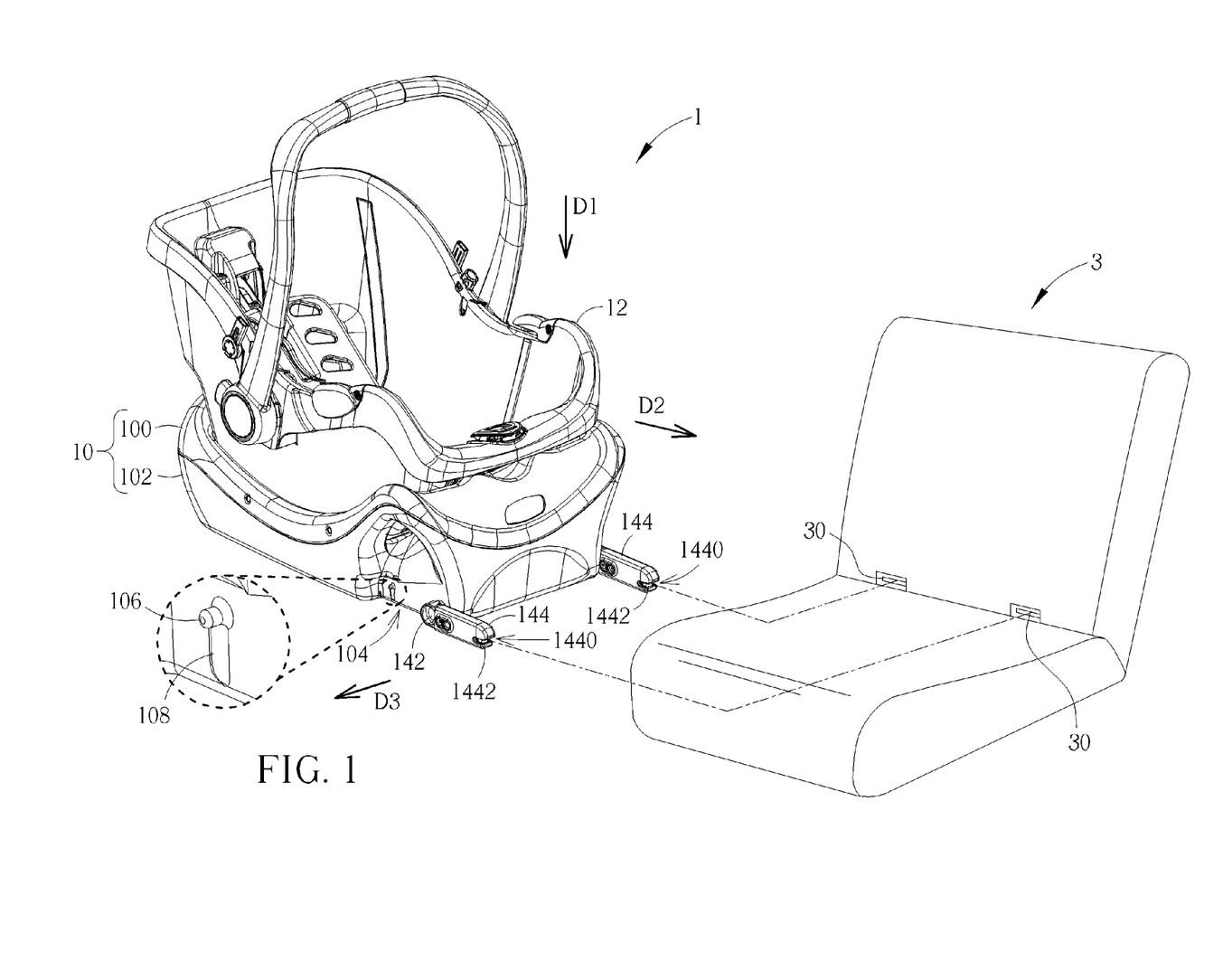
FIG. 1 is a schematic diagram illustrating a child safety seat and a vehicle seat according to an embodiment of the invention.
Figure 2:
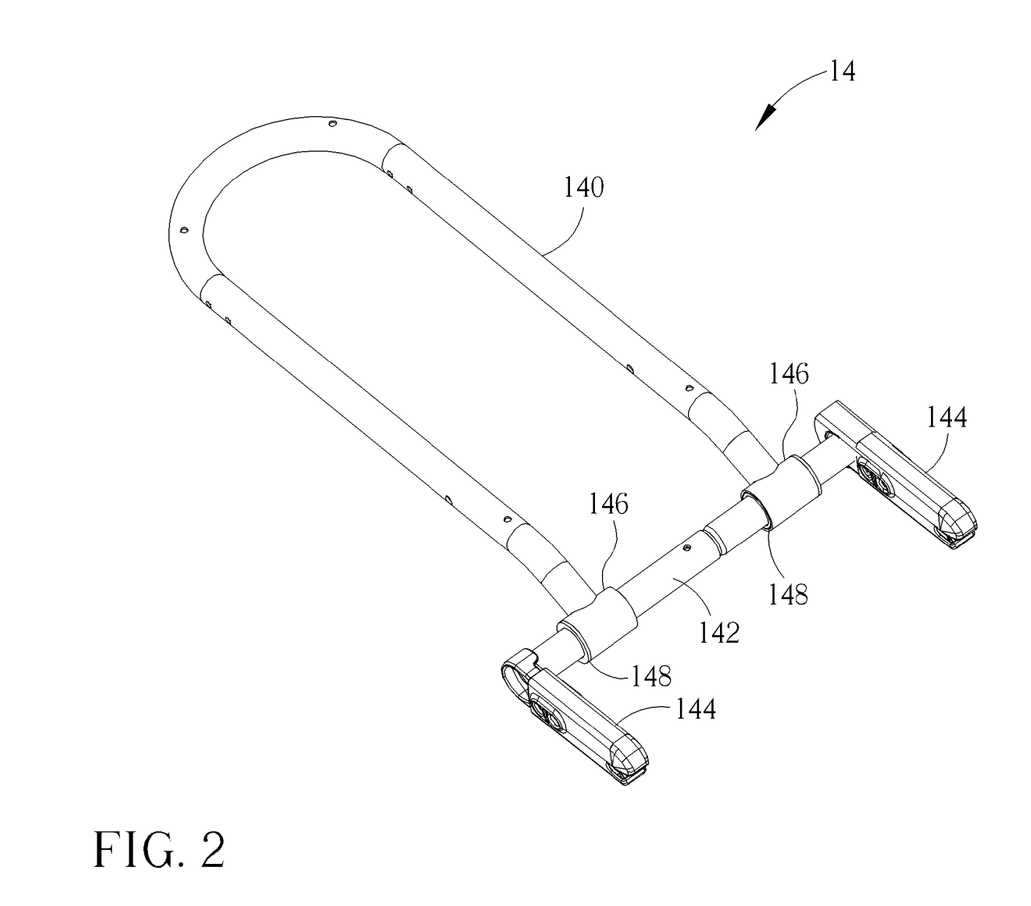
FIG. 2 is an assembly diagram illustrating a fixing device according to an embodiment of the invention.
Figure 3:
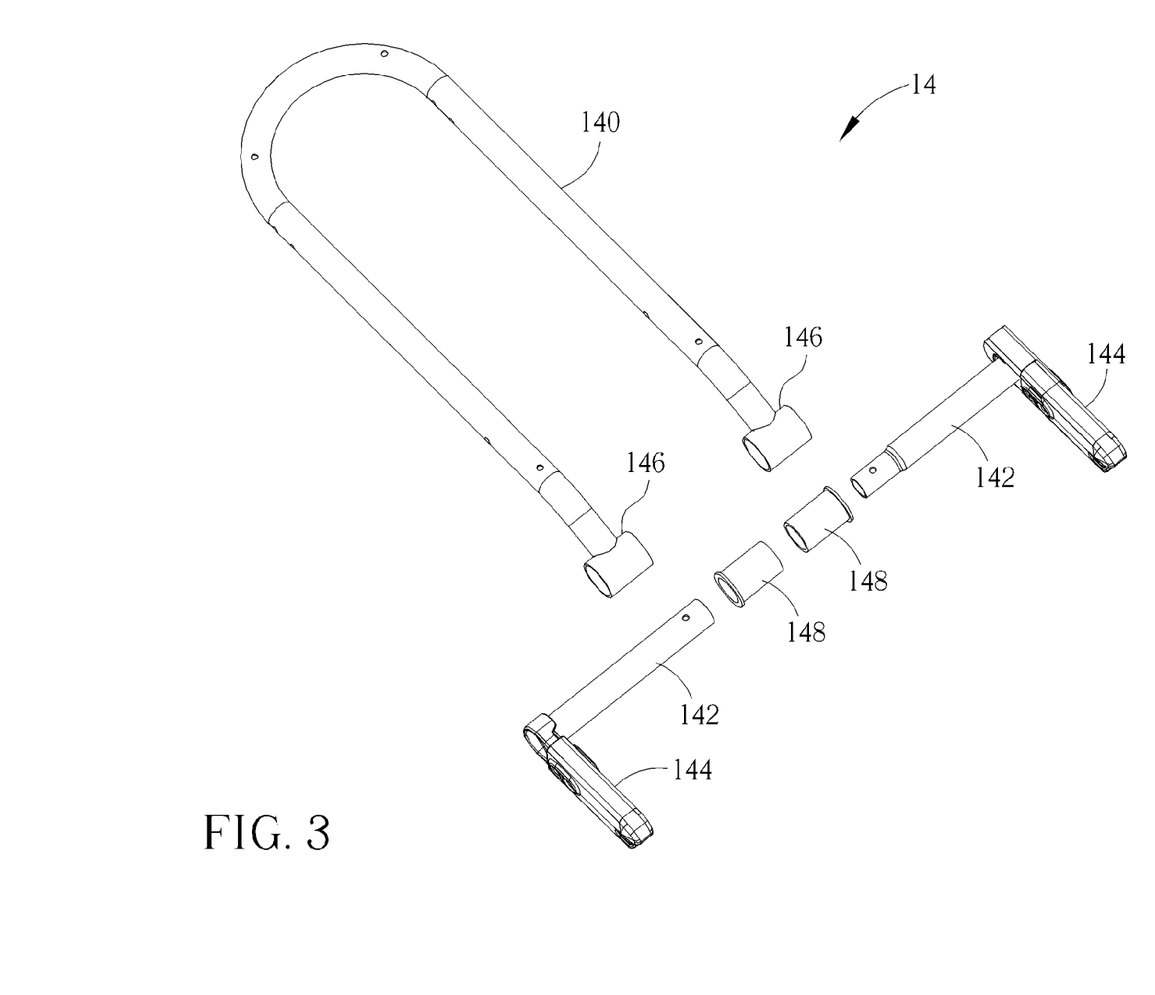
FIG. 3 is an exploded view illustrating the fixing device shown in FIG. 2.
Figure 4:
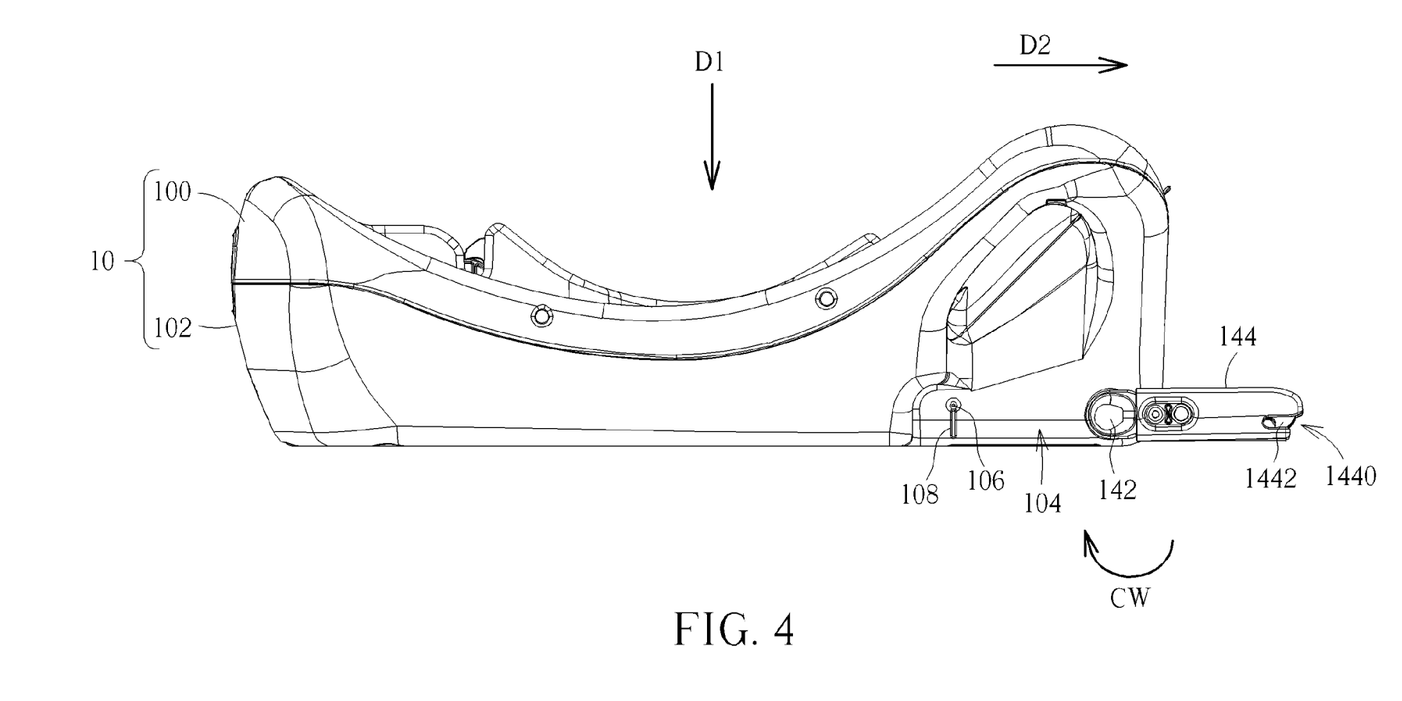
FIG. 4 is a side view illustrating the base of the child safety seat shown in FIG. 1, wherein the fixing member is located at a using position.
Figure 5:
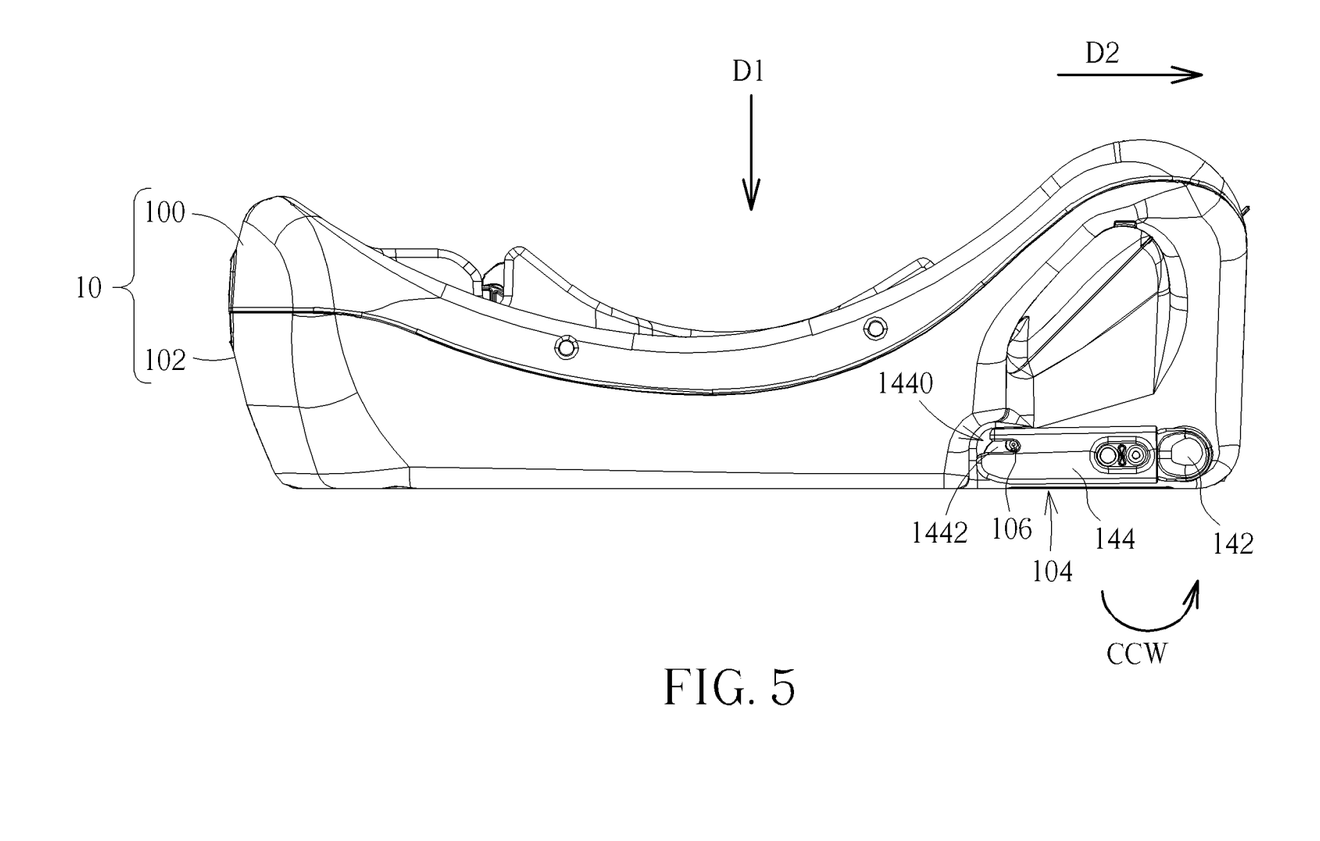
FIG. 5 is a side view illustrating the base of the child safety seat shown in FIG. 1, wherein the fixing member is located at an accommodating position.

Referring to FIGS. 1 to 5, FIG. 1 is a schematic diagram illustrating a child safety seat 1 and a vehicle seat 3 according to an embodiment of the invention, FIG. 2 is an assembly diagram illustrating a fixing device 14 according to an embodiment of the invention, FIG. 3 is an exploded view illustrating the fixing device 14 shown in FIG. 2, FIG. 4 is a side view illustrating the base 10 of the child safety seat 1 shown in FIG. 1, wherein the fixing member 144 is located at a using position, and FIG. 5 is a side view illustrating the base 10 of the child safety seat 1 shown in FIG. 1, wherein the fixing member 144 is located at an accommodating position.

As shown in FIGS. 1 to 3, the child safety seat 1 comprises a base 10, a seat body 12 and a fixing device 14 and the fixing device 14 comprises a fixing frame 140, a pivot axle 142, two fixing members 144, two sheath members 146 and two ring members 148. In this embodiment, the fixing frame 140 is U-shaped and the two sheath members 146 can be connected to opposite ends of the fixing frame 140 by a welding process. Then, the two ring members 148 can be disposed on the pivot axle 142 and disposed in the two sheath members 146 so as to pivotally connect the pivot axle 142 to the fixing frame 140. In other words, the ring member 148 is disposed between the sheath member 146 and the pivot axle 142 so as to prevent the pivot axle 142 from rubbing against the sheath members 146 during rotation. The two fixing members 144 are pivotally connected to opposite ends of the pivot axle 142, respectively. Accordingly, the two fixing members 144 are capable of rotating simultaneously through the pivot axle 142.

In this embodiment, the base 10 may comprise an upper casing 100 and a lower casing 102. To assemble the base 10 and the fixing device 14, the upper casing 100 is detached from the lower casing 102 first, the fixing frame 140 and the pivot axle 142 of the fixing device 14 are put into the lower casing 102, and then the upper casing 100 is attached to the lower casing 102. As shown in FIG. 1, the two fixing members 144 are exposed out of opposite sides of the base 10 after assembly.

An assembling direction D1 is defined on the base 10 and a facing direction D2 is defined on the seat body 12. The seat body 12 is assembled on the base 10 along the assembling direction D1. When a child is seated in the seat body 12, the child faces the facing direction D2. After assembling the seat body 12 on the base 10 along the assembling direction D1, the pivot axle 142 of the fixing device 14 is disposed in an axial direction D3, which is perpendicular to the assembling direction D1 and the facing direction D2 of the seat body 12.

As shown in FIG. 1, the vehicle seat 3 comprises two fixing rods 30. A user can dispose the base 10 of the child safety seat 1 on the vehicle seat 3 and connect the fixing members 144 of the fixing device 14 to the fixing rods 30. In this embodiment, the fixing device 14 and the fixing rods 30 of the vehicle seat 3 both conform to ISOFIX standard. In other words, the fixing device 14 is an ISOFIX fixing device. The fixing member 144 comprises a slit hole 1440 and an engaging hook 1442. The engaging hook 1442 is disposed in the slit hole 1440. The fixing member 144 can be engaged with the fixing rod 30 by the engaging hook 1442.

Each of the opposite sides of the base 10 has an accommodating recess 104. The fixing member 144 can rotate with respect to the base 10 between an accommodating position shown in FIG. 5 and a using position shown in FIG. 4. As shown in FIG. 4, a user can rotate the fixing member 144 from the using position shown in FIG. 4 to the accommodating position shown in FIG. 5 in a clockwise direction CW. When the fixing member 144 is located at the accommodating position shown in FIG. 5, the fixing member 144 is accommodated in the accommodating recess 104. On the other hand, as shown in FIG. 5, the user can rotate the fixing member 144 from the accommodating position shown in FIG. 5 to the using position shown in FIG. 4 in a counterclockwise direction CCW. When the fixing member 144 is located at the using position shown in FIG. 4, the fixing member 144 can be connected to the fixing rod 30 of the vehicle seat 3. Therefore, when the child safety seat 1 of the invention needs to be stored, the user can rotate the fixing member 144 from the using position shown in FIG. 4 to the accommodating position shown in FIG. 5 so as to accommodate the fixing member 144 in the accommodating recess 104 of the base 10. Accordingly, the child safety seat 1 can be stored conveniently.

As shown in FIGS. 1, 4 and 5, each of the opposite sides of the base 10 has a restraining portion 106 and a guiding rib 108. The guiding rib 108 is connected to the restraining portion 106 correspondingly. It should be noted that only one restraining portion 106 and only one guiding rib 108 on one side of the base 10 are shown in the figures due to viewing angle. When the fixing member 144 is located at the accommodating position shown in FIG. 5, the slit hole 1440 of the fixing member 144 is engaged with the restraining portion 106 so as to position the fixing member 144 at the accommodating position shown in FIG. 5 securely. The guiding rib 108 is used for guiding the fixing member 144 when the fixing member 144 is rotating toward the accommodating position so as to enable the fixing member 144 to rotate more smoothly.

Figure 6:
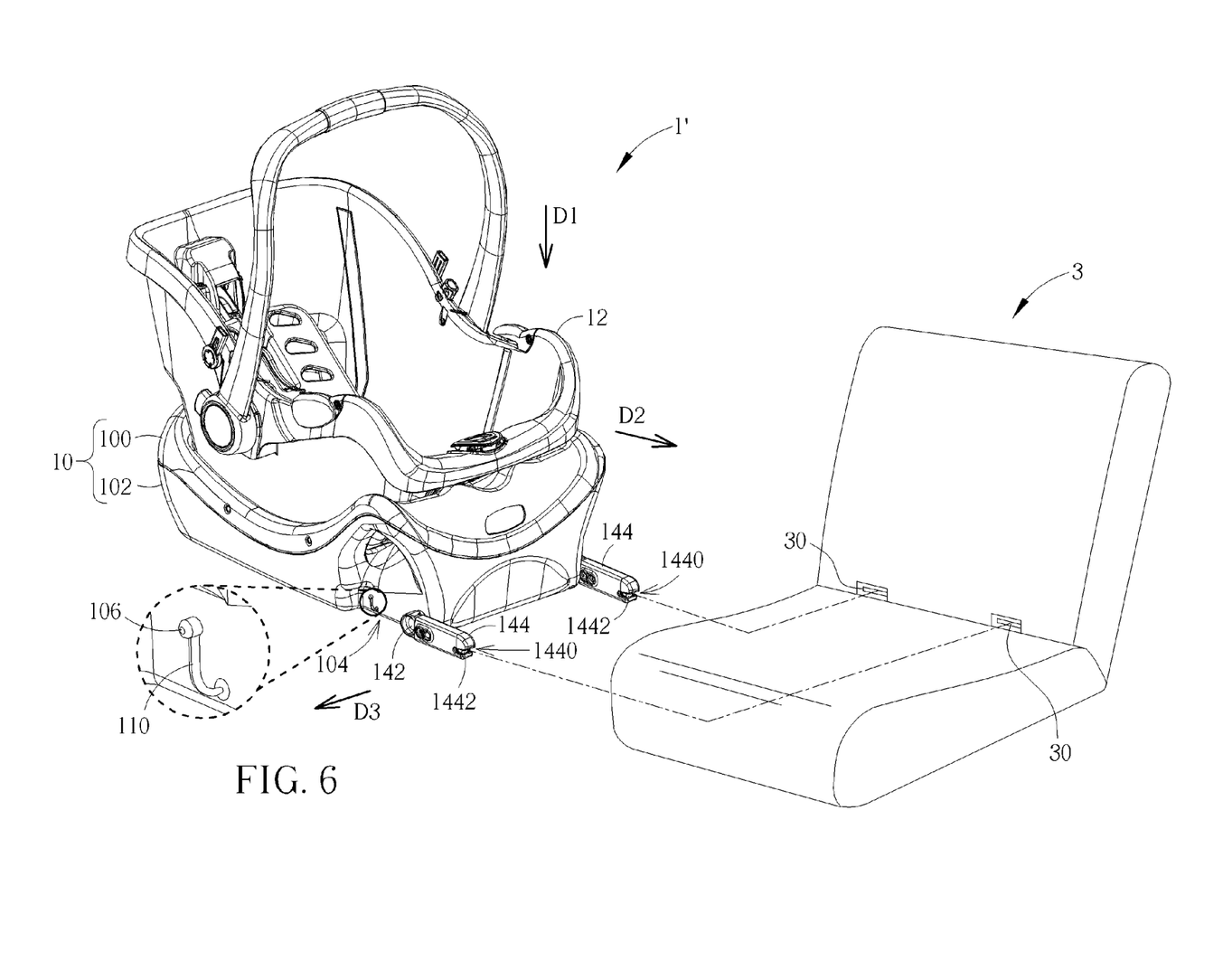
FIG. 6 is a schematic diagram illustrating a child safety seat according to another embodiment of the invention.

Referring to FIG. 6, FIG. 6 is a schematic diagram illustrating a child safety seat 1' according to another embodiment of the invention. As shown in FIG. 6, the main difference between the child safety seat 1' and the aforesaid child safety seat 1 is that each of the opposite sides of the base 10 of the child safety seat 1' has a resilient cantilever member 110 and the restraining portion 106 protrudes from an end of the resilient cantilever member 110 correspondingly. It should be noted that only one restraining portion 106 and only one resilient cantilever member 110 on one side of the base 10 are shown in the figure due to viewing angle. The resilient cantilever member 110 will be compressed by the fixing member 144 slightly during rotation of the fixing member 144. When the fixing member 144 is located at the accommodating position, the compressed resilient cantilever member 110 is released such that the restraining portion 106 on the resilient cantilever member 110 is engaged with the slit hole 1440 of the fixing member 144. It should be noted that the same elements in FIG. 6 and FIG. 4 are represented by the same numerals, so the repeated explanation will not be depicted herein again.

Figure 7:
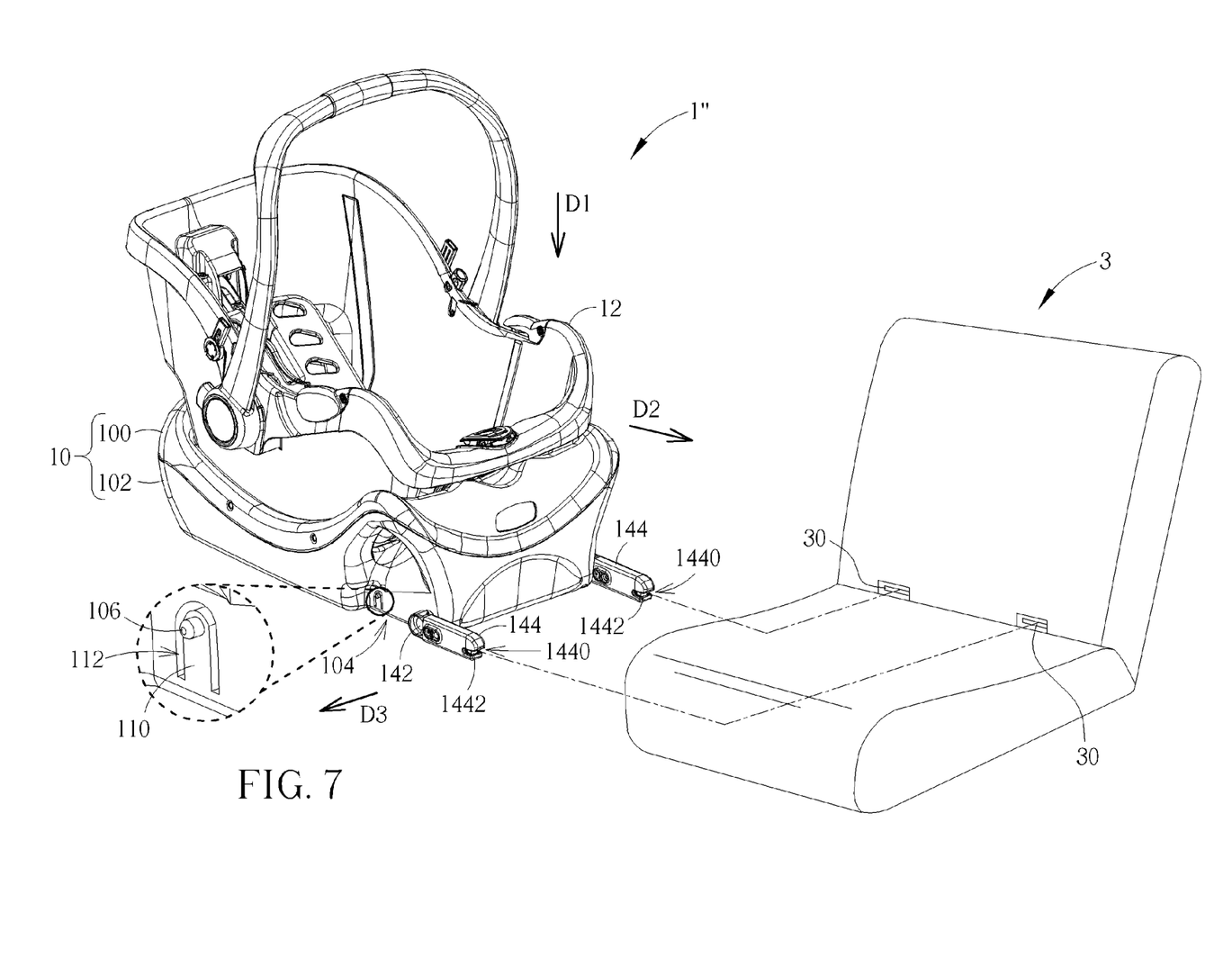
FIG. 7 is a schematic diagram illustrating a child safety seat according to another embodiment of the invention.

Referring to FIG. 7, FIG. 7 is a schematic diagram illustrating a child safety seat 1" according to another embodiment of the invention. As shown in FIG. 7, the main difference between the child safety seat 1" and the aforesaid child safety seat 1' is that each of the opposite sides of the base 10 of the child safety seat 1" has a void 112 formed thereon and the resilient cantilever member 110 is disposed in the void 112 of the base 10 correspondingly. When the resilient cantilever member 110 is compressed by the fixing member 144, the resilient cantilever member 110 can deflect into the void 112 slightly so as to achieve the same function as the resilient cantilever member 110 of the child safety seat 1'.

As mentioned in the above, the axial direction of the pivot axle, which pivotally connects the fixing device of the child safety seat to the base, is perpendicularly to the assembling direction of the base and the facing direction of the seat body such that the fixing member of the fixing device of the child safety seat can pivot with respect to the base between the accommodating position and the using position. When the child safety seat of the invention needs to be stored, a user can rotate the fixing member from the using position to the accommodating position so as to accommodate the fixing member in the accommodating recess of the base. Accordingly, the child safety seat can be stored conveniently. Furthermore, when the fixing member is located at the accommodating position, the slit hole of the fixing member can be engaged with the restraining portion of the base such that the fixing member can be positioned at the accommodating position securely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat adapted to be disposed on a vehicle seat, the vehicle seat comprising a fixing rod, the child safety seat comprising:
    a base, an assembling direction being defined on the base, the base being capable of being disposed on the vehicle seat;
    a seat body, a facing direction being defined on the seat body, the seat body being assembled on the base along the assembling direction; and
    a fixing device comprising a pivot axle being pivotally connected to the base, the fixing device used for connecting with the fixing rod, an axial direction of the pivot axle being perpendicular to the assembling direction and the facing direction, the fixing device further comprising:
        a fixing frame disposed in the base;
        the pivot axle disposed in the base and pivotally connected to the fixing frame; and
        two fixing members fixed on opposite ends of the pivot axle and exposed out of opposite sides of the base, respectively, the two fixing members being capable of rotating simultaneously through the pivot axle, wherein each of the fixing members comprises a slit hole;
    wherein each of the opposite sides of the base has an accommodating recess, a restraining portion, and a guiding rib connected to the restraining portion correspondingly, the guiding rib protruding from a lateral side of the base, the fixing member is capable of rotating with respect to the base between an accommodating position and a using position, and the guiding rib guides the fixing member when the fixing member is rotating toward the accommodating position by the guiding rib engaging the fixing member and urging the fixing member slightly away from the base in order to engage the slit hole with the restraining portion;
    when the fixing member is located at the accommodating position, the fixing member is accommodated in the accommodating recess and the restraining portion is engaged with the slit hole so as to position the fixing member at the accommodating position; when the fixing member is located at the using position, the fixing member is capable of being connected to the fixing rod.

2. The child safety seat of claim 1, wherein the fixing device further comprises:
    a sheath member connected to the fixing frame; and
    a ring member disposed between the sheath member and the pivot axle.

3. The child safety seat of claim 1, wherein each of the fixing members comprises an engaging hook disposed in the slit hole, the fixing member is engaged with the fixing rod by the engaging hook.

4. The child safety seat of claim 1, wherein the fixing device is an ISOFIX fixing device.

* * * * *